US011093293B2

(12) United States Patent
Matus

(10) Patent No.: US 11,093,293 B2
(45) Date of Patent: Aug. 17, 2021

(54) CONFIGURING NODES FOR DISTRIBUTED COMPUTE TASKS

(71) Applicant: George P. Matus, Salt Lake City, UT (US)

(72) Inventor: George P. Matus, Salt Lake City, UT (US)

( * ) Notice: Subject to any disclaimer, the term of this patent is extended or adjusted under 35 U.S.C. 154(b) by 15 days.

(21) Appl. No.: 16/243,383

(22) Filed: Jan. 9, 2019

(65) Prior Publication Data

US 2019/0213046 A1 Jul. 11, 2019

Related U.S. Application Data

(60) Provisional application No. 62/615,313, filed on Jan. 9, 2018.

(51) Int. Cl.
*G06F 9/46* (2006.01)
*G06F 9/50* (2006.01)
*H04L 12/24* (2006.01)
*H04L 12/26* (2006.01)

(52) U.S. Cl.
CPC ............ *G06F 9/5044* (2013.01); *H04L 41/12* (2013.01); *H04L 43/0817* (2013.01); *G06F 2209/505* (2013.01); *G06F 2209/5011* (2013.01); *G06F 2209/5021* (2013.01)

(58) Field of Classification Search
CPC .................................................... G06F 9/5044
USPC ......................................................... 718/104
See application file for complete search history.

(56) References Cited

U.S. PATENT DOCUMENTS

| 8,706,798 | B1* | 4/2014 | Suchter | G06F 9/5038 |
| | | | | 709/202 |
| 8,813,125 | B2* | 8/2014 | Reisman | G06F 16/954 |
| | | | | 725/34 |
| 8,873,568 | B2* | 10/2014 | Hiie | H04L 45/00 |
| | | | | 370/400 |
| 8,931,009 | B2* | 1/2015 | White | H04N 7/173 |
| | | | | 725/46 |
| 9,262,221 | B2* | 2/2016 | Chen | G06F 9/5011 |
| 10,476,985 | B1* | 11/2019 | Spina | G06F 9/5005 |
| 2005/0010608 | A1* | 1/2005 | Horikawa | G06F 9/4862 |

(Continued)

OTHER PUBLICATIONS

Substratum, How it Works, https://substratum.net/how-it-works/, Accessed May 1, 2019.

(Continued)

*Primary Examiner* — Evral E Bodden
(74) *Attorney, Agent, or Firm* — Workman Nydegger

(57) ABSTRACT

Systems and methods are provided for improving compute job distribution using federated computing nodes. This includes identifying a plurality of independently controlled computing nodes which then receive a token such that they can each be identified as being authorized to participate in a federated computing node cluster. Metrics associated with the particular nodes are then received and based on the received metrics compute jobs are assigned to the particular node by assembling a compute job data packet comprising the one or more compute jobs and transmitting the assembled compute job data packet to the particular node. Other features are also described in which assigned compute jobs and/or unrelated compute tasks can be dynamically modified in order to optimize compute job completion based on the received metrics.

20 Claims, 3 Drawing Sheets

(56) References Cited

U.S. PATENT DOCUMENTS

2008/0279167 A1* 11/2008 Cardei ................. H04W 28/26
370/342
2014/0047342 A1* 2/2014 Breternitz ............. G06F 9/5061
715/735
2019/0213046 A1* 7/2019 Matus ................... G06F 9/5061

OTHER PUBLICATIONS

Substratum Network, Technical Paper version 1.0, Accessed May 1, 2019.
What is Golem, https://docs.golem.network/#/About/What-is-Golem, Accessed May 1, 2019.
The Golem Project, Crowdfunding Whitepaper, Accessed May 2, 2019.

* cited by examiner

CONFIGURING NODES FOR DISTRIBUTED COMPUTE TASKS

CROSS-REFERENCE TO RELATED APPLICATIONS

This application claims the benefit of and priority to U.S. Provisional Patent Application Ser. No. 62/615,313 filed on Jan. 9, 2018 and entitled "CONFIGURING NODES FOR DISTRIBUTED COMPUTE TASKS." This application expressly incorporates herein the entirety of the foregoing applications.

BACKGROUND OF THE INVENTION

Hardware and software interfaces can also be utilized to allow computers to work together to share computing resources in order to solve large and/or complex computational problems. For example, processing requirements for technical problems such as encryption, artificial intelligence, machine learning, big-data processing and analysis, scientific research, and other modern computing needs are difficult to accomplish using standard computing resources.

Recently, block-chain technology has been applied to utilized decentralized tracking and verification of enormous amounts of data such as transaction information, inventory management, and other big-data problems. A key aspect of block-chain technology is the need to perform complex hashing algorithms. Such algorithms are complex enough that a common computing system might never successfully complete a single block verification within the useful lifespan of the system. However, by distributing the processing and computational load of such block verification processing across many machines, the computations can be successfully completed.

Operating such a system—for example a distributed processing environment potentially thousands or even millions of computing nodes—is enormously complex and difficult, not to mention expensive. Because of this, there are very few large-scale computing resources capable of completing computationally complex problems-such as block verification—at large scale.

Further, aside from the expense of a single entity controlling and operating such a distributed system, the technical complexity of configuring, maintaining, operating such a system may be prohibitive. Accordingly, such activities have been limited to users/entities that have the funds, programming knowledge, and advanced skill set to configure specialized mining or compute hardware. In one example, most people lack the required skill set, including lacking proper understanding to complete the setup process involved in setting up wallets, registering on cryptocurrency exchanges, tuning their hardware for efficiency, etc., that would be necessary to effectively complete block-chain verification computations.

At the same time, and as discussed above, computational resources are generally widely available. Cell phones, desktop computers, laptop computers, tablets, and even smart appliances all have processing capabilities that go unutilized during much of the life. For example, a user's home computing system may sit unused for 8 hours every day while the user is at work. Similarly, a corporation's computing resources may sit idly for the 16 hours a day that are outside of normal business hours.

Despite the many needs for large-scale distribute computing, the and the immense amount of underutilized processing resources, there is still an ongoing need and desire to provide new and improved computer interfaces for utilizing existing resources for completing computationally complex processing.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Disclosed embodiments include new and improved computer interfaces for facilitating optimized distributed computing environments using individually controlled computing resources that are federated into ad-hoc computing node clusters.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

In one embodiment, a node management computing system is described for improving compute job distribution using federated computing nodes and includes identifying a plurality of independently controlled computing nodes and then transmitting a token to each of the plurality of independently controlled computing nodes. Notably, the token is configured such that each of the plurality of independently controlled nodes can be identified as being authorized to participate in a federated computing node cluster. Then, for each particular node within the federated computing node cluster, the system receives one or more metrics associated with the particular node and based on the received one or more metrics, assigns one or more compute jobs to the particular node. The assigned compute jobs are then assembled into a compute job data packet comprising the one or more compute jobs. The assembled compute job data packet is then transmitted to the particular node. The system receives an indication from the particular node that at least one of the assigned compute jobs has been completed.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION OF THE PREFERRED EMBODIMENTS

Disclosed embodiments include new and improved systems and methods for improving and optimizing distributed compute job environments. Even more particularly, the disclose embodiments enable many individually managed computing resources to be federated into an ad-hoc computing node cluster such that their computing resources can be aggregated and used to perform complex computational work.

As will be appreciated from the disclosure presented herein, the disclosed embodiments provide significant improvements in computer technologies relating to the manner in which unrelated computing resources can be linked together to perform work as an ad-hoc federated node cluster. Additionally, embodiments are also included that allow the individual controllers of each node in the cluster to individually configure and manage certain aspects of how their computing resource is used within the node cluster.

For example, in some embodiments, a user may be able to configure their computing resource to become part of a specific federation of nodes that are focused on performing certain types of computations, such as block chain verification, scientific research, motion graphics rendering, or other types of jobs.

In other embodiments, a node manager is provided that can control some aspects of the federated nodes according to a user preference. In one such example, a node manager can affect resource consumption at a federated node, even with regard to resources that are being consumed for activities unrelated to a compute job assigned to the node.

In other embodiments, user interfaces are provided that allow users to participate in ad-hoc federated node clusters without requiring the user to understand complex configurations or techniques that would normally be needed to implement a distributed node cluster.

Figure 1:
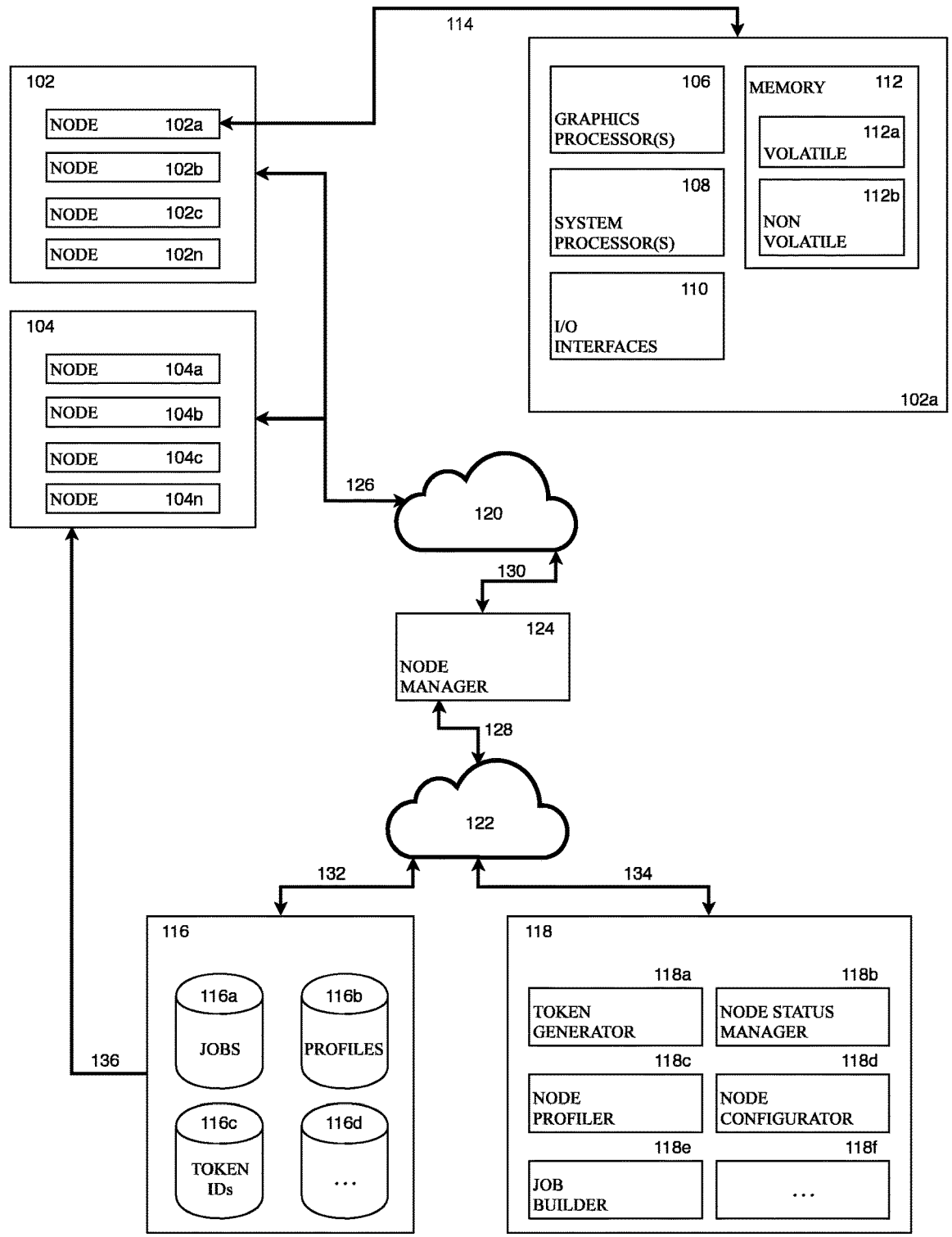
FIG. 1 illustrates an exemplary system for optimizing distributed compute resources and job assignments, according to an embodiment.

FIG. 1 illustrates an exemplary system 100 that includes a first node cluster 102, a second node cluster 104, and a node manager 124. As illustrated, node manager 124 may be connected to node clusters 102 and 104 through a network 120.

Node manager 124 is also connected to data resources 116 and compute resources 118. Node manager 124 may be connected to resources 116 and 118 over a network 122. As can be appreciated, network 122 may comprise a closed local network, a distributed private network, the internet, or any other suitable means for connecting and transmitting data between computing systems. It is also further anticipated that data resources 116 and/or compute resources 118 may alternatively be either fully or partially implemented within the same system as node manager 124.

As illustrated, data resources 116 comprise data libraries or databases 116a, 116b, 116c, 116d. For the sake of example, some potential categories of data resources are labeled with the corresponding databases such as "jobs" for data resource 116a, "profiles" for data resource 116b, and "token IDs" (identities) for data resources 116c. Data resource 116d is labeled with an ellipsis to illustrate that data resources 116 may include any number of data resources that are configured as different data sources. It is also appreciated that while the data sources are illustrated as separate sources, some embodiments may combine the data sources into a single source or federation of distinct data resources may be implemented.

Compute resources 118 are illustrated including a token generator 118a, node status manager 118b, node profiler 118c, node configurator 118d, and job builder 118e. As can be appreciated, these or other compute resources may be implemented as software, hardware, or a combination of software and hardware as needed. For example, a hardware token generator device may be implemented as token generator 118a that is capable of communicating with node manager 124, while a node profiler 118c may be implemented in software available within node manager 124.

As with data resources 116, compute resources 118 may include the illustrated exemplary resources, fewer resources, or additional or other resources.

As illustrated, cluster 102 includes node 102a, 102b, and 102c. The cluster also includes node 102n to illustrate that a cluster may include a vast number of nodes including tens, hundreds, thousands, or even millions of nodes. Similarly, cluster 104 also includes nodes 104a, 104b, 104c, and 104n.

It is appreciated that just as individual clusters may include essentially any number of individual nodes, node manager 124 may also be configured to handle essentially an unlimited number of clusters.

As illustrated by connector 114, node 102a within cluster 102 is further illustrated. As shown, node 102a may include a graphics processor 106, system processor(s) 118, input/output interfaces 110, and memory 112 that may include both volatile memory 112a and non-volatile memory 112b.

It should be appreciated that at least some of the nodes within clusters 102 and/or 104 comprise computing resources that are not directly managed or controlled by node manager 124. For example, some of the nodes within the illustrated clusters may be computing systems owned by individuals rather than by the operator of the node manager 124.

In some embodiments, the controller of a particular node receives an application or service to install on their computing system. For example, the owner of code 102a may receive a computer executable utility from the operator of node manager 124 that is suitable for installation on node 102a.

Upon receipt of the utility, the user may operate the executable such that the utility is installed within the memory 112 of node 102a. In some embodiments, the utility user will then direct the user through configuration including selecting particular options related node 102a. For example, the user may configure the type(s) of compute tasks they prefer to do. In some embodiments, users are able to opt-in to compute resources of a particular type, source, difficulty, length, etc. However, in other instances may instead configure their node according to an output requirement such as an amount that need to be accomplished in a particular time period, an amount of energy to consume, or the like. In this way, any type of compute job that matches the designated outcome may be processed.

Users may also be able to configure parameters regarding resource utilization, such as time of day to compute, resource utilization thresholds (e.g., minimum performance standards), or other options. However, these options are removed from the complex configuration needed to perform the underlying computations using the user's existing hardware. Rather, these options are focused on allowing the user to make personalized decisions to customize the experience while the underlying application takes care of the complexities of formulating, transmitting, and monitoring the completion of the compute tasks.

Upon installation of the previously mentioned utility or application on the node and configuration of the node by the user, node manager 124 may then receive the configuration parameters selected by the user. Node manager 124 may then utilize data resources 116 and compute resources 118 to match compute jobs to the node, formulate the compute jobs, further configure the node to accomplish the compute jobs, build and transmit the compute jobs, and other functions.

Consider for example an embodiment in which the user of node 102*a* has installed the utility provided by node manager 124 and identified that block-chain verification (or crypto-currency mining, as it is often called) is the type of compute tasks the user would like to participate in.

In such an embodiment, the utility may help the user configure their experience by providing estimations or predictions for various parameters. For example, based on profiling the user's system (e.g., hardware configuration, network configuration, historical resource utilization, etc.), the application can inform the user of estimations for the amount of mining the user is likely to be able to accomplish in a given period. For example, node manager 124 may utilize node profiler 118*c* and in conjunction with known hardware profiles stored in profiles 116*b* to calculate parameters relating to mining a particular cryptocurrency. Node manager 124 may then inform the user of the amount of computations that may be accomplished over a given interval or the amount of time that would be necessary to complete computation for a given threshold of mining.

Based on this information, the user of node 102*a* may select certain configuration options that will allow for node manager to select specific compute jobs that match those preferences.

In some embodiments, the application may also inform the user of modifications that could be adopted by the user to alter those computation estimations. For example, a user may receive a recommendation to modify the operation of node 102*a* in a specific way to increase the amount of available processing resources that can be devoted to accomplishing the desired compute tasks. For example, node manager 124 may utilized the utility to suggest to the user, based on the profiling, to lower the frame-rate while playing a particular game to free up additional compute resource on a graphics processor 106 on a video card within their computing system. In such embodiments, the user may be presented with a visualization of the tradeoff. For example, a visualization may be included that indicates that a X % reduction in gaming frame-rate may allow for a Y % increase in mining efficiency or effort. The user may then be able to accept or decline the recommendations based on their preference.

Continuing with the block-chain verification example, complex scheduling is also available through the application. For example, the application could allow a user to schedule mining activities when their computer is below a particular utilization threshold, below a threshold for a particular time, for particular times of day, to coincide with decreased utility costs, to maintain particular compute thresholds, to augment or support other compute resources other than the user's computer system (e.g., other computer systems run by other users), or any number of other considerations.

In some embodiments, the application allows a user to execute block-chain verification operations on behalf of a centralized entity. This may be advantageous to both the user and the other entity because of particular benefits that can be realized in mining once large processing thresholds have been met that would otherwise be impossible for an individual miner to meet alone. For example, a computational bonus may be granted to a user that completes a full unit of mining work (e.g., an entire block). However, an individual user's computer may take months, years, or even longer to singularly compute a single block.

In some embodiments, computations may be performed for trusted entities such as non-profits, research facilities, or the like. In this way, the user effectively donates processing resources to a known entity in a manner that allows the entity to benefit. In some such embodiments, the entity may specifically require certain compute tasks to be accomplished-such as with a research and development entity. In other embodiments, users may donate processing resources to perform computations that will result in monetary benefit to an organization, such as mining cryptocurrency that is then donated to an entity other than the owners of the particular nodes.

In some embodiments, because a time element may also be involved in computing an entire block-chain block, an individual may never be able to compute a single block on their own because another system may be able to compute it faster and thereby receive a block compute bonus before the user can receive it. Thus, by pooling resources with other individuals to thereby generate a large system, block bonuses can be achieved. In some embodiments, this bonus can then be distributed across the system in addition to credit for executing the particular portions of the compute. In this manner, collections of individuals are able to improve mining outcomes without increasing required computational output.

In some embodiments, the utility installed at the user computing system utilizes a unique token that is registered with node manager 124. For example, upon installation of the utility, node manager 124 may utilize token generator 118*a* to generate and assign a token for the particular node, for example node 102*a*.

In some embodiments, this token can be used simply to identify the node such that computational efforts of the particular node system can be individually identified an attributed to the user while the combined effort can be aggregated. In such embodiment, the user can then track their mining computation efforts, compare their results with others, and then alter their compute resources to affect their outcomes.

In addition, the token can also be used to identify different node cluster federations a particular node is participating in. Accordingly, in some embodiments, a particular node may receive numerous tokens that are associated with different compute jobs, different compute job sources, or the like. In this way, the particular tokens can be utilized on a job by job basis, including allowing a node to be associated with multiple different sets of configuration information (as previously described) depending on the particular type of compute job being executed.

In some embodiments, a token is sent in response to receiving a request at the utility installed one the node. Alternatively, tokens may be pushed to the node by node manager 124 as necessary (for example, when a new compute function has been assigned to the node that is not associated with a token already at the node). In this way, the token can be used to identify both the node itself as well as the particular federations to which the node belongs.

Aside from the previous examples where nodes are specifically used to mine crypto currencies or perform blockchain verification, networks of computers running the application or utility described herein can form a decentralized supercomputing network. In this manner, entities that have complex computing tasks can have those tasks executed at the nodes within the network and they can do so predictably and reliably due to the application understanding the profile of the individual nodes. For example, based on an understanding of the hardware capabilities of nodes within the system, an initial set of predictions can be generated around the amount of time a particular compute operation will need in order to complete. This initial prediction can then be modified with additional information obtained through the application such as normal resource utilization at the particular nodes, the preferences of the nodes (e.g., the time of day they prefer to compute or the types of tasks they prefer to compute), or other information. This reduces uncertainty for the entity that needs the compute task executed while maintaining reliability within the distributed system.

In other embodiments, based on a requested incoming compute tasks, users could receive notification via the application that new compute requests have come in. The notifications could include a visualization that offers alternatives to a user to better understand the benefits of prioritizing the compute to execute at their system versus using the system for other tasks (e.g., gaming.) Such compute tasks may include resource intensive math and artificial intelligence (AII based simulations, deoxyribonucleic acid (DNA) mapping, medical simulations, graphical rendering, video rendering, encoding, or transcoding.

In some embodiments, the application may be configured to allow seamless switching between mining operations and other requested compute operations. In some embodiments, such seamless switching may be advantageous to ensure that a particular resource is being used in the most efficient manner. For example, a particular node may be configured to execute compute jobs associated with block-chain verification tasks when the node is otherwise idle but then switch to less resource intensive compute tasks when under load, such as when the user is utilizing the node for activities other than, or in addition to, the compute tasks. Such switching may occur based on detection of resource utilization thresholds, overall network resource utilization thresholds, user preference, or other factors. For example, the installed utility may be configured to monitor resource utilization, quality of service, or other metrics at the node to ensure compute tasks are optimized.

In some embodiments, compute tasks may be staggered and dynamically adjusted based on demand. For example, if the network experiences low demand for compute tasks at any given time, nodes may be switched to higher complexity tasks. In this way, resources are most efficiently utilized. Of course, any such switching must also meet the requirements of user preferences, as previously discussed.

It is also recognized that in some embodiments, the particular configuration of a given machine in the network may have an effect on the types of compute operations that would be most efficient for it to execute. For example, a user of a computer system with a less powerful graphics processing unit may be presented with options for compute that have been identified, based on configuration of the user's system, to be the most efficient for the particular user to execute. In this way, a user can weigh the benefits of selecting a particular operation that is more compatible with their system versus selecting an operation that the user might prefer for another reason but would be unaware that their machine will have more difficulty processing such operations. In some embodiments, many different types of operations may be presented to a user and may further be ranked according to the relative predicted efficiency the user's computer will be able to complete them.

As has been previously discussed, node manager 124 may maintain a data resource, such as resource 116b, to track know hardware profiles. By utilizing these profiles, optimized compute tasks can be identified.

In some embodiments, profiles 116b may include any number of useful metrics. For example, hardware profiles may store information relating to the performance characteristics and capabilities associated with a very specific set of hardware and software components. For example, a particular node may include multiple graphical processor(s), such as graphics processors 106, that can only be operated independently. In another scenario, a particular node may include graphics processors that are configured to operate together. Profiles 116b may be configured to collect and profile both types of configurations and then match those profiles to new or existing nodes.

In other embodiments, prior to assigning a particular compute job, a portion of the job may be tested against a known profile in order to establish a baseline computational expectation for executing the job within a given profile environment. In other embodiments, such a baseline may be predicted or estimated based on historical data, heuristics, specific known technical specifications associated with hardware element (e.g., bandwidth, throughput, etc.), or other data.

In some embodiments, more computationally difficult tasks may be rewarded at a higher rate than less difficult processing. However, in some embodiments, less difficult tasks may be more beneficial to the network because they can be completed relatively faster than harder tasks. In some embodiments, a visualization user interface may be provided at the node that allows a user to balance the predicted computational effort versus the predicted benefit of completing a particular computation or computation type.

Because of this, profiles 116b may be used both to optimize the types of compute jobs that are selected and assigned to a particular node based on a variety of metrics beside simple compatibility or minimum requirements. Instead, jobs can be selected based on additional considerations such as user preference, outcome preference, source preference, computation type preference, or other preferences.

However, in some embodiments, a user may not be able to select certain types of compute jobs or categories unless they have a baseline threshold of computation capacity. In some embodiments, a user may be prompted through the utility with actions they could take in order to qualify for threshold limited tasks (e.g., upgrade hardware, reduce use of the computer system for conflicting tasks, leave the computer running over night, etc.)

Implementing the distributed system detailed above can be done according to one of several infrastructure paradigms. In a first configuration, and as illustrated by system 100 of FIG. 1, a type of "hub-and-spoke" configuration is utilized in that a centralized server or group of servers is deployed to manage the network. Then, any number of node computing systems are then linked to the central servers over any suitable network.

Each node is configured with an application that includes instructions that enable the application to communicate with the central servers in order to receive instructions, report progress, etc. The application is also configured to implement compute or mining operations (assigned to the particular computer from the central server) on the user's computer by executing code at the user's computer. For example, an application operating at a node may receive a hashing operation to execute as part of a cryptocurrency mining operation.

The application is then configured to implement the hashing operation using the hardware available at the user's system, such as the central processing unit (CPU), graphics processing unit (GPU), field programmable gate array (FPGA), or application-specific integrated circuit (ASIC) or other resources within the computer system. Upon completion of the operation, the application is then configured to report a completion status back to the central servers to log the transaction. In some instances, the application is configured to continually receive instructions and transmit updates back to the central server. In other configurations, the application receives a set of instructions and waits to report back until the operations have been completed. In some embodiments, receiving and transmitting are done by the application on a schedule, while in other embodiments they are done according to network availability or user preference. Regardless of how the receiving and reporting occurs at the application, it is only necessary that the application receive an instruction to implement at the computer system and then report back a status of that operation at a later time.

In such a hub-and-spoke implementation, there is no need for communication between or among the various nodes in the system as the central server manages all of the interactions and logging. However, in another configuration, a central server is implemented in association with interconnected nodes. In such a scenario, the central server functions as a mediator and an ultimate authority on managing and logging transactions. Because the nodes are interconnected, some of the communication, assignment, reporting, etc., may occur through intermediary nodes before ultimately being reported back to the central server for logging. For example, an application at a user's computer may receive an instruction to execute a particular compute operation.

During execution of the compute operation, the user may decide to begin using some of the computer systems resources for other unrelated tasks. Depending on parameters received with the compute instruction, the application may determine that the compute task (or even a portion of the compute task) would be better executed at another computer system. In that scenario, the application may send out a broadcast to other nodes in the network seeking available computational resources.

In other embodiments, the application may be preconfigured with fallback nodes to pass computation tasks onto. However, when another node is determined, the application on the original computer system would communicate with the application on a target computer system and pass the compute operation assignment to the new computer system for execution. Upon eventual completion, the application operating at the new computer system would then report the completion back to the central server along with an identifier of the computer system that completed the task. In the case of a split transaction where some of the operation was completed at more than one computer system, system identifiers for each system that executed some of the transaction may be included in the reporting back to the central server.

In other embodiments, other rules may be in place for reporting an identifier for which machine completed the task (e.g., only the final machine is reported.)

In yet another embodiment, no central server or servers are used to manage the system. Instead, the entirety of the management system is distributed across all of the nodes using the application itself. In such a system, upon completion of a compute task, a verification of completion is propagated across the node set. Once at least a majority of the nodes in the network have verified the completion of the task (e.g., for a system with N computers, consensus is reached when ½N+1 computer have verified the transaction.) Once consensus has been reached, the transaction is logged in a ledger or log file that tracks all assigned transactions. Because the ledger is also distributed across all of the nodes, known concepts of distributed ledgers can be utilized in order to verify and account for each transaction.

In such distributed ledger implementations, at least some of the nodes, in addition to solving compute or direct mining tasks, would also be involved in executing proof of work computations in order to establish and maintain the distributed ledger. Because these types of compute functions are internal to the network, and function solely to maintain the network, different types of requirements and associated thresholds may be implemented in order to fairly assign out such compute tasks. In some embodiments, some nodes may be particularly well suited (e.g., have optimized hardware, software, utilization patterns, etc.) for performing internal verification functions. In such cases, those nodes may receive benefits from the node network as a whole to account for the fact that the node is performing internal tasks for the good of the network.

The application installed at each node in the system is configured to provide a number of capabilities to the system. From the user's perspective, the application includes functionality that allows a user to schedule compute operations, select compute operation types, view options for altering the configuration of their system to optimize for particular compute operations, calculate costs associated with performing compute operations, and other information.

From the network perspective, the application is also configured to ascertain certain characteristics of each node. For example, the application may be configured to determine the computational throughput of a particular node based on profiling the hardware within the node. In some embodiments, this may be performed by executing diagnostics at the node that are configured to match or simulate various types of computations the network may request the node executes. In other embodiments, simple identification of hardware may be cross referenced to known throughputs or capabilities (e.g., graphics card X is known to have Y teraflops of throughput.)

In some embodiments, the application is configured to allow a user to designate how they would like to receive credit for supporting compute operations within the system. For example, in some embodiments a user may be able to select a payment method, credit method, karma method, score method, gamified method, or some other method that functions to record the contributions the particular computer system running the application has made toward compute operations. In some embodiments, a user is able to select more than one option. For example, in one embodiment a user is able to select that half of the credit they earn for completing compute operations should be assigned a cryptocurrency value while the other half of credit they earn should be assigned to network credit the user can utilize to have compute operations performed by the network on behalf of the user.

In one embodiment, a credit store is utilized that facilitates transactions within the network. For example, a user may receive a particular credit, coin, value, token, or some other identifier of value within the network that the user can then utilize to perform other functions within the network. In some embodiments, the internal network value store may be exchanged for a value store that is external to the network. In other embodiments, a user can utilize the internal value store to build reputation within the network, establish a network score, customize their user experience, or share a representation of their value store with other members of the network.

In some embodiments, the application is configured to establish a baseline performance estimation that is based solely on the hardware within the computing system. However, the application may additionally be configured to monitor the actual utilization of the hardware over time and as actual compute tasks are assigned and completed. Such ongoing monitoring may be beneficial as it may account for hardware utilization expended outside of the present system. In other words, the application may identify that a particular computing system has very high initial compute capabilities based on the hardware within the computing system. However, over time it may become apparent that the user of the very capable system is also a frequent gamer that utilizes a large amount of resources for gaming that cannot be used for executing compute operations. Thus, over time, an observed capacity may be developed for a particular node that augments or even supersedes any baseline profiling that occurs.

In some embodiments, the application is configured to automatically start and stop compute or mining operations based on intelligently analyzing the user's computer system and identifying appropriate and/or beneficial times during which operations should be completed. In some embodiments, intelligent computations may override less specific user preferences. In some embodiments, the application may prompt a user for permission to override a particular user preference for a particular compute operation.

Again, as with the network configurations discussed above, this information about the particular nodes may be stored at a centralized server and then used to make assignment determinations. In other embodiments, the application operating at the particular node may simply implement the profile when receiving or requesting new tasks such that only appropriate tasks are executed at the node.

In some embodiments, the application is also configured to display scenarios to a user that allow the user to better understand compute options available to the user. For example, imagine a scenario where an application has profiled a node and determined that the node includes hardware resources that would allow the node to execute 1000 compute tasks a day. However, based on historical logging or user input, the application has also determined that two thirds of the node's compute resources are utilized during any particular computation window. Further, the historical logging has also identified that during those times in which two thirds of compute resources are otherwise unavailable to the compute network, the majority of those resources are being spent rendering graphics for computer game play. Finally, the application has determined that during computer game play, the user frequently configures the games to operate at the most computationally demanding settings (e.g., resolution, framerate, anti-aliasing, shading, etc.). Using these data points, in some embodiments, the application may present a user with information identifying benefits to the user for decreasing the computational resources dedicated to game play and redirecting them (or simply making them available through non-use) to the compute network. For example, in one visualization, the application may identify that by reducing anti-aliasing X %, Y additional compute tasks can be executed each day. Armed with this information, the user may then opt to modify gameplay to allocate more resources to the compute tasks.

In another example, the application may present a user with a visualization indicating that reducing the time of gameplay during each gaming session by X minutes, over one month (or some other time period), Y additional compute tasks can be completed.

In another example, the application may present a user with a visualization showing times of the day that may be better for the user to utilize the node for gaming or other non-compute activities, and times that it would be more beneficial for performing compute activities.

In another example, the application may present the user with alternative hardware configurations. For example, in a scenario where a user has more than one GPU (e.g., a scalable link interface (SLI) configuration), the application may provide information regarding the benefits of dedicating at least one of the GPUs to compute tasks while still allowing the other(s) to support other operations, such as gaming. Such information may additionally include predictions of both increased compute execution as well as any anticipated performance impacts that may be discoverable with regard to the other tasks that will be executed during the compute tasks.

It should be appreciated that because of the distributed network of nodes but the relatively limited set of alternative uses for node resources, a node application need not identify or create visualizations, predictions, or estimates from scratch. Rather, such information may be configured to be directly shared among the nodes and/or to the central servers (where implemented) in order to more fully tune the network.

In some embodiments, the application may also be able to interface with the operating system of the node in order to tune other characteristics of the node. For example, many operating system implement background processes that affect available hardware resources. In some embodiments, the application operating at the node is configured to display for a user a listing of background processes operating at the computing system along with their relative load use.

In some embodiments, the application operating at the node is configured to directly interact with other operations occurring at the node. For example, as described above, the application may be configured to interact directly with a computer application such as a game, productivity application, or other resources. This interaction may include automatically modifying performance options associated with the other application in a manner that frees up computing resources for the compute tasks. For example, the application may be able to directly alter the framerate or resolution of a computer game to ensure that a threshold amount of resources remain available for compute tasks. Similarly, the application may pause, terminate, or throttle other background processes operating at the computer system that operate at the operating system level.

In some embodiments, the compute operations that are to be executed at a node are defined according to one or more metrics. For example, a particular compute operation may be identified by an identified hardware type best suited for executing the compute operation. For example, a graphical processing unit (GPU) may be identified as being an ideal hardware element for performing the compute operation. In some embodiments, this may be further refined by identifying a particular type, brand, configuration, or other parameter that more specifically identifies the hardware item. For example, in the case of having identified that a GPU is the ideal hardware, further consideration may be given to identifying the brand of the GPU, the number of cores within the GPU, the throughput of the GPU, the supported instructions of the GPU, or other such parameters.

Another metric may include a timeframe during which the compute operation should be executed. For example, a particular compute operation may need to be completed and returned to the server in sub-seconds, minutes, hours, or may include an indication that time is not a concern.

Another metric may include a requirement for reliability. For example, a particular compute operation may be flagged as needing to be executed at a node that has a known minimum threshold of execution success, time, accuracy, or another related parameter.

Another metric may include geographic identifiers such that a particular compute operation may be flagged as needing to be executed within a certain geographic region, or according to a network latency zone (e.g., a location from which a network performance standard may be achieved, regardless of the physical location of the node.)

Once the metrics have been defined for the compute operation, the operation may be assigned to a compute node that meets the requirements. Assignment may be completed in many ways. In one embodiment, a centralized server tracks the metrics associated with the available parameters such that each node can be identified before assignment as qualifying for receipt of the particular compute task. In another embodiment, a broadcast may be sent to some or all of the nodes that includes the parameters. The application operating at the node may then recognize that its node qualifies. In some embodiments, the first qualifying node that accepts the task is assigned the task. In other embodiments, qualifying nodes may return a notification to the central server of availability. The central server then assigns the task to one of the available nodes. In some embodiments, assignment is configured as a random assignment, a round-robin assignment, a time rotation assignment, a weighted assignment, a reputation assignment, or some other suitable distribution scheme.

Figure 2:
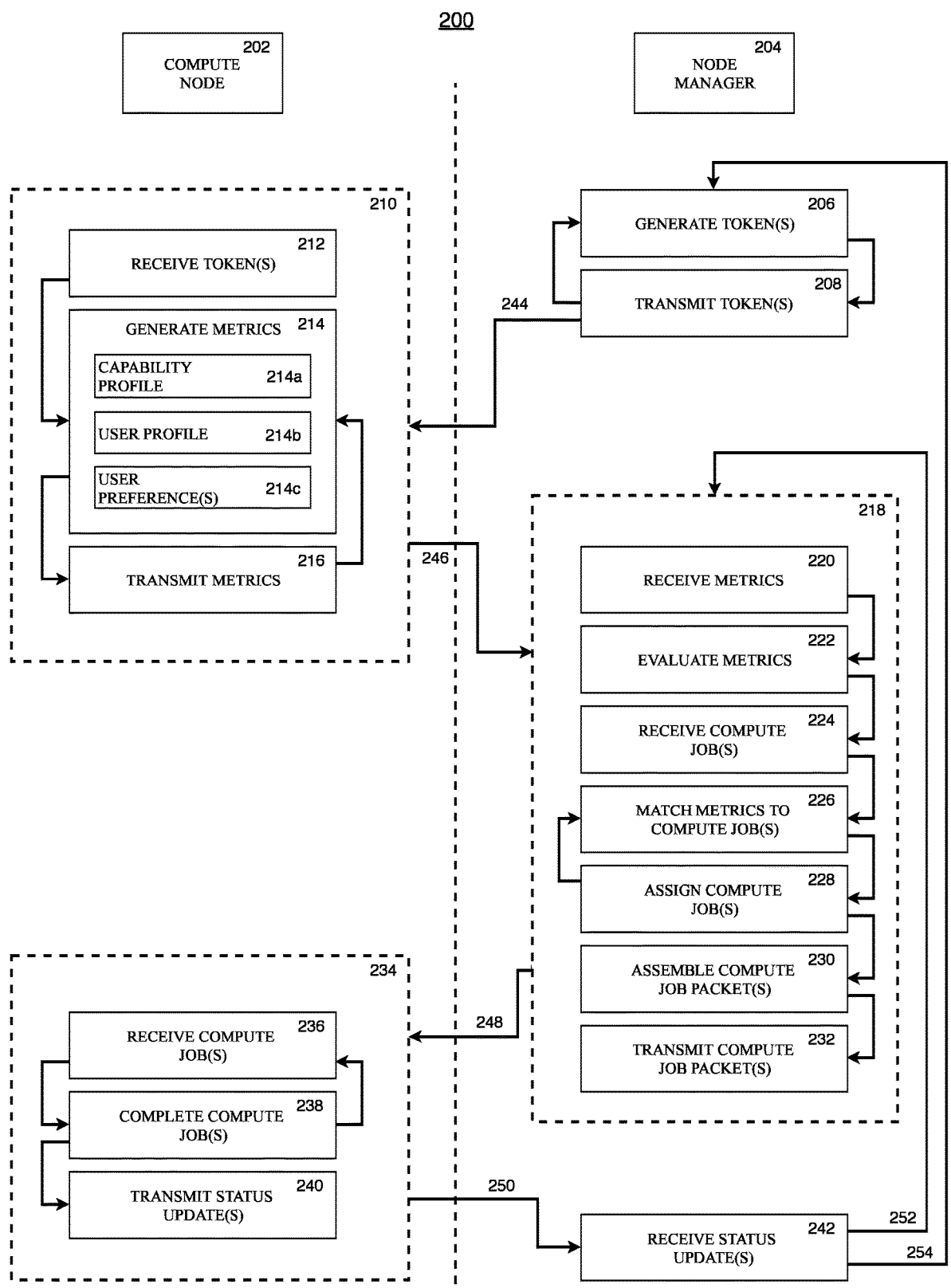
FIG. 2 illustrates a flow diagram of an exemplary system including compute node processes and node manager processes, according to an embodiment.

Turning now to FIG. 2, a system 200 that includes a node manager 204 and compute node 202 is illustrated. Within the illustration, the various elements necessary to operate the distributed compute node system are shown according to whether an element is executed at the compute node 202 or at the node manager 204. Notably, this embodiment is non-limiting and in other embodiments some of the illustrated operations may be operated at the other component or at a component other than node 202 or node manager 204.

In this particular embodiment, node manager 204 generates token(s) 206 and then performs an act 208 of transmitting the tokens using a communications interface 244 such as the internet. In one embodiment, node manager 204 relies on a compute resource such as token generator 118a of FIG. 1 to generate the tokens. Additionally, once tokens are generated, node manager 204 may be configured to have the generated token ID and other associated information stored at a data resource such as token IDs 116c.

The token 206 is received at compute node 202. Compute node 202 then performs a series of operations 210 including an act 212 of receiving the tokens, an act 214 of generating metrics, and an act 216 of transmitting metrics. Notably, as part of act 214, node 202 may generate a compatibility profile 214a, a user profile 214b, and a user preferences profile 214c which then form the metrics transmitted in act 216.

As illustrated, the metrics are transmitted over network link 246 back to node manager 204. Again, this may occur over a public network such as the internet.

Node manager 204 then performs a series of acts 218 after having received the transmitted metrics beginning with an act 220 of receiving the metrics. An act 222 of evaluating the metrics also occurs, along with an act 224 of receiving compute jobs. Notably, although system 200 illustrates the acts 218 as being sequential, in some embodiments, the ordering may differ. For example, in some embodiments, node manager 204 may already have received compute jobs that then form the basis of generating tokens 206.

Regardless of the sequence of acts 218, once the both the metrics and the compute jobs are received by node manager 204, an act 226 of matching particular compute jobs to the received metrics can occur. As previously described, this matching process may include matching numerous elements of the compute jobs to the metrics such as computational requirements, source identifiers, compute types, outcome requirements, throughput requirements, time requirements, energy utilization requirements, or any such metrics as previously described.

In one embodiment, node manager 204 may utilize compute resources such as node status manager 118b, node profiler 118c, and/or node configurator 118d to aid in performing matching. Additionally, one or more of the data resources such as jobs 116a or profiles 116b may be utilized to identify appropriate jobs to assign to the node.

Once suitable compute jobs have been identified, node manager 204 performs an act 220 of assigning the compute job to a particular node and then act 230 of assembling a compute job packet. As has been previously described, these acts may be accomplished in conjunction with compute resources such as resources 118 discussed in conjunction with FIG. 1. For example, job builder 118e may be utilized by node manager 204 to assemble the assigned compute jobs for transmission to the assigned node.

After assembly of the job packet(s), node manager 204 performs an act 232 of transmitting the job packet(s) back to compute node 202, for example over network link 248.

Node 202 then performs a series of acts 234, including act 236 of receiving the compute jobs, an act 238 of completing the compute jobs, and an act 240 of transmitting status updates back to node manager 204. Node manager 204 may utilize a compute resource such as node status manager 118b and a data resource to track the completion status of various jobs. Additionally, based on the results of a particular compute job, node manager 204 may update or alter certain data resources such as profiles 116b to reflect an actual outcome of a particular type of job based on the resources known to have been utilized to complete the job. In this way, node manager 204 can implement machine learning in order to improve estimations, predictions, and assignment optimization.

As can be appreciated, depending on the embodiment, certain of the forgoing acts may be completed in iterative cycles before advancing to other acts. For example, acts 210 may include receiving a first token and then generating first metrics, receiving a second token and then generating second metrics, and only then performing the act 216 of transmitting the first and second metrics back to node manager 204.

Similarly, acts 218 may include an iterative loop of acts 226 matching compute jobs and act 228 of assigning those jobs. For example, node manager 204 may iteratively work through a listing of available jobs and perform matching and assigning for a particular node until the list is exhausted. The identified jobs may then be assembled into a single job packet and sent to compute node 202.

Figure 3:
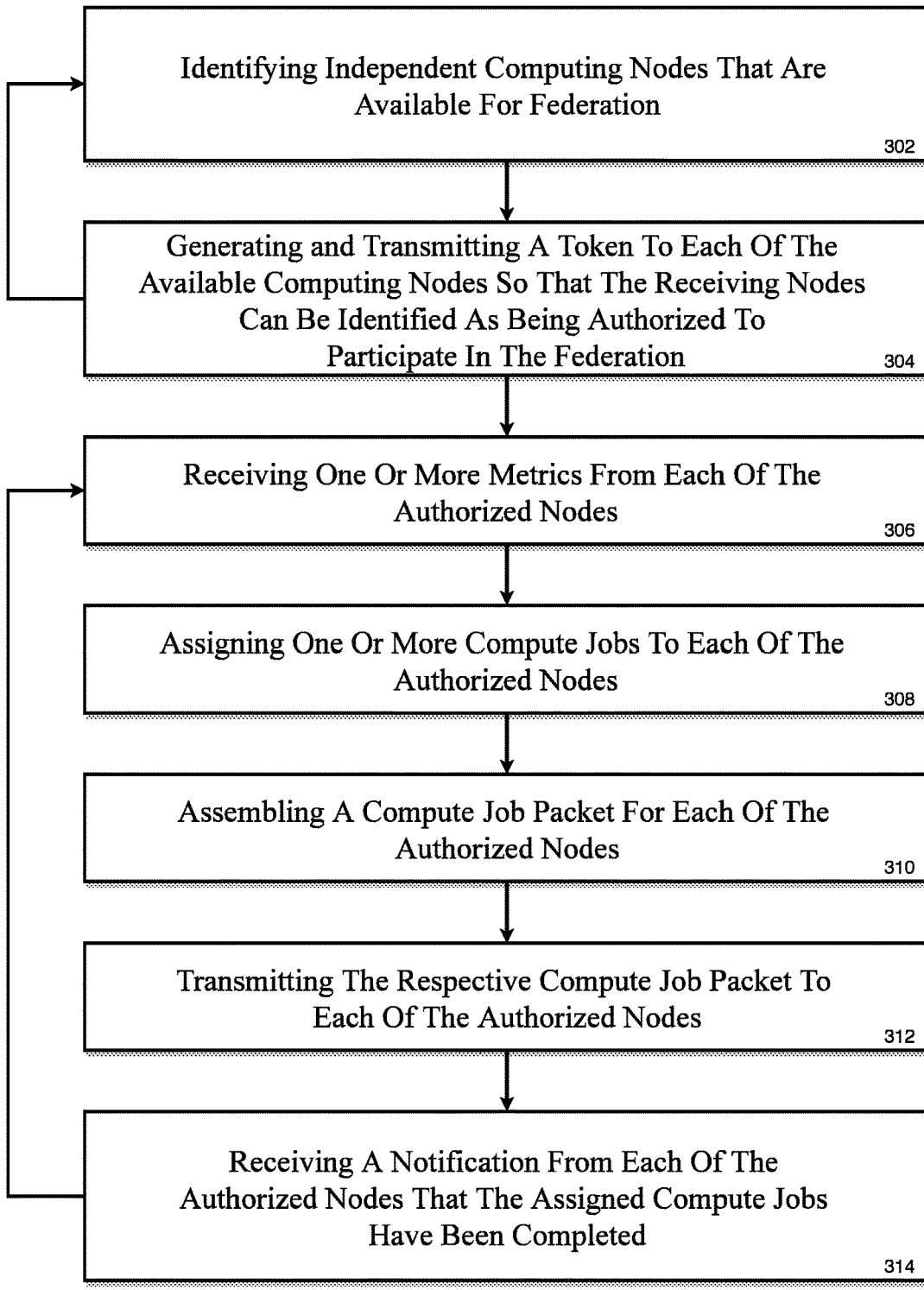
FIG. 3 illustrates a flow diagram to an exemplary method for improving a distributed compute job environment using federated computing nodes.

Turning now to FIG. 3, one embodiment 300 for optimizing compute job distributions using federated computing nodes is illustrated. An act 302 includes identifying a plurality of independent controlled computing nodes. For example, act 302 may be accomplished by a node manager based on a data resource of nodes that have installed the aforementioned utility. It is appreciated that accomplishing this using independent controlled nodes is fundamentally different than within a dedicated networking environment where compute nodes are centrally managed. Thus, in this embodiment, each of the identified nodes is associated with an entity that is different than the entity operating a node manager, such as node manager 124 of FIG. 1.

After the plurality of independent nodes has been identified, an act 304 of a generating and transmitting a token to each of the plurality of independently controlled computing nodes. The token is configured such that each of the plurality of independently controlled nodes can at least be identified as being authorized to participate in a federated computing node cluster. As previously described, the initial token ID may simply be an identifier for the node manager system to track each of the nodes in the federated cluster. Additional tokens may be generated and transmitted to the node in conjunction with compute job assignments or other activities, as necessary.

As can be appreciated, the particular node need not know what other computing nodes are in its same federation. However, node manager 124 must track this information. Accordingly, different token IDs may be arbitrarily assigned to the various nodes and then tracked, using a data resource such as token IDs 116c of FIG. 1, to manage the various federated clusters.

Once the nodes have been identified and federated using token IDs, a series of acts are then performed for each of the nodes. It is appreciated that these acts at each node may be performed simultaneously across all nodes and the results aggregated by a node manager. Consequently, while the following acts are identified as being in a particular sequence, they need not necessarily proceed in this particular sequence and certain nodes may perform the acts differently, depending on the embodiment.

However, generally, for each node act 306 includes receiving one or more metrics associated with the particular node. For example, as previously describe, the metrics may include hardware profiles, software profiles, user preferences, etc., that inform the types of compute jobs the node is both capable of and has been authorized to complete. In some embodiments, these metrics are then stored in a data resource, such as profiles 116b, such that a node manager can track this information for the node for the current and future compute jobs.

Act 308 includes assigning one or more compute jobs to a particular node based on the metrics received from that node. As was discussed in conjunction with acts 226 and 228 of FIG. 2, this may be accomplished by a node manager utilizing rules, heuristics, data resources, and compute functionality as previously described.

Act 310 includes assembling a compute job packet that includes the compute jobs matched and assigned to the particular node. In some embodiments, multiple different compute jobs-potentially assigned to multiple different token IDs—may be assembled into a single packet. In other embodiments, the compute jobs may be segmented according to token ID, source, type, etc., Act 310 includes transmitting the assembled compute job packet to the assigned node. In some embodiments, transmission maybe modified based on considerations including network bandwidth, MTU, or other considerations separate from the node or compute jobs.

Act 314 includes receiving, at the node manager, a notification that at least one of the assigned compute jobs has been completed by the compute node. As has been previously described, the sequence of the compute node receiving jobs, completing jobs, and transmitting updates may allow for a particular node to transmit a completion on a task-by-task basis, even within a job, or it may be configured to transmit an update at the end of a complete job.

In some embodiments, the token(s) generated during act 304 may be generated in response to receiving a request from the compute node. For example, node manager may not be configured to transmit a token ID to a particular node until that node has successfully installed a utility. Then, upon successful installation, the utility may then request the token ID.

In one embodiment, the one or more metrics comprises an identification of one or more hardware elements of the computing node. Then, based on analysis of the one or more hardware elements, the one or more assigned compute jobs are selected by at least comparing the assigned compute jobs with the one or more hardware elements.

In another embodiment, comparing the assigned compute jobs with the one or more hardware elements involves one or more steps. For example, profiling the one or more hardware elements, determining one or more baseline processing measures, and/or identifying a plurality of compute jobs that are capable of being executed based on the determined baseline processing measures. This optimized compute job packet may then be assembled in act 310 such that it comprises the identified plurality of compute jobs.

In one embodiment, the one or more metrics include one or more user preferences that can be analyzed by a node manager and used to assign compute jobs by comparing the assigned compute jobs with the one or more user preferences.

In one embodiment, the one or more user preferences include one or more of a job category preference, a maximum resource consumption preference, a minimum work output preference, or a time preference.

In one embodiment of method 300 further includes receiving an indication from a particular node that a resource request has been made at the node unrelated to the assigned compute jobs. For example, a utility installed at the node may identify that a user of the node is utilizing the node to perform computing tasks unrelated to the assigned compute jobs-such as gaming, browsing the internet, etc. Based upon receiving the indication, the node manager may then dynamically modify one or more of the assigned compute jobs.

In a different embodiment, the compute node may receive a similar indication that the node is utilizing resources outside of completing the assigned compute job(s). However, instead of dynamically modifying the compute jobs, the node manager is configured to dynamically alter an aspect of the node with respect to the unrelated resource request.

For example, suppose a node had received and was performing computations relating to an assigned compute job packet. During computation, a user of the node determines that they would like to play a graphics intensive computer game. In order to do so, some amount of resources of the GPU being utilized to perform the assigned compute jobs must now be reallocated to accommodate the unrelated resource request (e.g., the gaming.) This, in some embodiments, the node manager is configured to dynamically modify the performance of the unrelated resource request in a manner that maintains (or less dramatically impacts) the assigned compute jobs.

For example, if the unrelated resource request was computer gaming, the node manager may be configured to reduce the framerate of the game being played. In that way, fewer GPE resources may be reallocated to the unrelated task.

It is appreciated that such a modification may incorporate the metrics and user preferences previously described. For example, upon configuration of the node by the user, user interface elements may be presented that allow a user to make selections regarding how compute jobs should be matched, assigned, and managed.

In one embodiment, a user is presented with a first user interface (UI) selection that allows them to configure the types of jobs they would like to execute. A second UI selection may be provided to set scheduling regarding when compute jobs should execute. A third UI selection may be provided to identify acceptable sources from which compute jobs should be selected. Another UI element may provide a selection indicating how conflicts between resource utilization request should be handled, such as, for example, by setting priority levels.

Accordingly, in one embodiment, a user may set a preference that indicates the types of performance modifications to unrelated resource requests the node manager is authorized to take as well as threshold preferences the node manager should utilize when making those dynamic modifications to optimize how the compute node is utilized while ensure that the user still has some ability to utilize the node for other tasks.

The disclosed client system(s) and server system(s), nodes, and node managers of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes random access memory (RAM), read-only memory (ROM), electrically erasable programmable read-only memory (EEPROM), compact disc read-only memory (CD-ROM) or other optical disk storage (such as compact discs (CDs), digital versatile disc (DVDs), etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network personal computers (PCs), minicomputers, mainframe computers, mobile telephones, personal digital assistants (PDAs), pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, operating at node management computing system, for improving compute job distribution using federated computing nodes, the method comprising:
   identifying a plurality of independently controlled computing nodes, the independently controlled computing nodes of the plurality of independently controlled computing nodes each being associated with different users;
   transmitting a token to each of the plurality of independently controlled computing nodes such that each of the plurality of independently controlled nodes can be identified as being authorized to participate in a federated computing node cluster; and
   for each particular node within the federated computing node cluster, performing at least:
      receiving (i) one or more metrics associated with performance characteristics and capabilities of the particular node and (ii) one or more defined user preferences based on one or more user interface selections by one or more particular users associated with operating the particular node, the one or more particular users being different from one or more other users associated with operating the node management computing system and one or more other users associated with operating a different particular node within the federated computing node cluster;
      based on analysis of the received one or more defined user preferences based on the one or more user interface selections by the one or more users associated with operating the particular node, assigning one or more compute jobs to the particular node;
      assembling a compute job data packet comprising the one or more compute jobs;
      transmitting the assembled compute job data packet to the particular node; and
      receiving an indication from the particular node that at least one of the assigned compute jobs has been completed.

2. The method of claim 1, wherein the token is transmitted based on receiving a request from an application installed at the particular node.

3. The method of claim 1, wherein the token includes a federation identifier that identifies a particular federation group assignment for the computing node.

4. The method of claim 1, wherein the one or more metrics comprises an identification of one or more hardware elements of the computing node, wherein based on analysis of the one or more hardware elements, the one or more assigned compute jobs are selected by at least comparing the assigned compute jobs with the one or more hardware elements.

5. The method of claim 4, wherein comparing the assigned compute jobs with the one or more hardware elements comprises at least:
   profiling the one or more hardware elements;
   determining one or more baseline processing measures;
   identifying a plurality of compute jobs that are capable of being executed based on the determined baseline processing measures;
   assembling an optimized compute job packet comprising the identified plurality of compute jobs; and
   transmitting the optimized compute job packet to the computing node.

6. The method of claim 1, wherein the one or more defined user preferences comprise a preferred type of computing task defined by a user interface selection of the one or more user interface selections.

7. The method of claim 1, further comprising:
   receiving an indication from a particular node that an unrelated resource request has been made at the particular node that is unrelated to the assigned compute jobs for the particular node; and
   based upon receiving the indication, dynamically modifying one or more of the assigned compute jobs.

8. The method of claim 1, further comprising:
   receiving an indication from a particular node that an unrelated resource request has been made at the particular node that is unrelated to the assigned compute jobs for the particular node; and
   based upon receiving the indication, dynamically causing the particular node to implement an internal modification affecting how the unrelated resource request is processed based on the one or more metrics.

9. A node management computing system comprising:
   one or more processors; and
   one or more computer-readable media having stored computer-executable instructions that are executable by the one or more processors to configure the node management computing system to optimize compute job distribution using federated computing nodes by configuring the node management computing system to perform at least the following:
   identifying a plurality of independently controlled computing nodes, the independently controlled computing nodes of the plurality of independently controlled computing nodes each being associated with different users;
   transmitting a token to each of the plurality of independently controlled computing nodes such that each of the plurality of independently controlled nodes can be identified as being authorized to participate in a federated computing node cluster; and
   for each particular node within the federated computing node cluster, performing at least:
      receiving (i) one or more metrics associated with performance characteristics and capabilities of the particular node and (ii) one or more defined user preferences based on one or more user interface selections by one or more particular users associated with operating the particular node, the one or more particular users being different from one or more other users associated with operating the node management computing system and one or more other users associated with operating a different particular node within the federated computing node cluster;
      based on analysis of the received one or more defined user preferences based on the one or more user interface selections by the one or more users associated with operating the particular node, assigning one or more compute jobs to the particular node;
      assembling a compute job data packet comprising the one or more compute jobs;
      transmitting the assembled compute job data packet to the particular node; and receiving an indication from the particular node that at least one of the assigned compute jobs has been completed.

10. The node management computing system of claim 9, wherein the one or more metrics comprises an identification of one or more hardware elements of the computing node, wherein based on analysis of the one or more hardware elements, the one or more assigned compute jobs are selected by at least comparing the assigned compute jobs with the one or more hardware elements.

11. The node management computing system of claim 10, wherein comparing the assigned compute jobs with the one or more hardware elements comprises at least:
profiling the one or more hardware elements;
determining one or more baseline processing measures;
identifying a plurality of compute jobs that are capable of being executed based on the determined baseline processing measures;
assembling an optimized compute job packet comprising the identified plurality of compute jobs; and
transmitting the optimized compute job packet to the computing node.

12. The node management computing system of claim 9, wherein the one or more defined user preferences comprise a time preference indicating one or more preferred time periods for computing tasks to be performed on the particular node, the time preference being defined by a user interface selection of the one or more user interface selections.

13. The node management computing system of claim 9, further comprising:
receiving an indication from a particular node that an unrelated resource request has been made at the particular node that is unrelated to the assigned compute jobs for the particular node; and
based upon receiving the indication, dynamically modifying one or more of the assigned compute jobs.

14. The node management computing system of claim 9, further comprising:
receiving an indication from a particular node that an unrelated resource request has been made at the particular node that is unrelated to the assigned compute jobs for the particular node; and
based upon receiving the indication, dynamically causing the particular node to implement an internal modification affecting how the unrelated resource request is processed based on the one or more metrics.

15. The node management computing system of claim 9, wherein each of the plurality of independently controlled nodes is controlled by an entity that differs from an entity that controls the node management computing system.

16. One or more computer-readable hardware storage media having stored computer-executable instructions that, when executed by one or more processors of a node management computing system, cause the node management computing system to optimize compute job distribution using federated computing nodes by configuring the node management computing system to perform at least the following:
identifying a plurality of independently controlled computing nodes, the independently controlled computing nodes of the plurality of independently controlled computing nodes each being associated with different users;
transmitting a token to each of the plurality of independently controlled computing nodes such that each of the plurality of independently controlled nodes can be identified as being authorized to participate in a federated computing node cluster; and
for each particular node within the federated computing node cluster, performing at least:
receiving one or more defined user preferences based on one or more user interface selections by one or more particular users associated with operating the particular node, the one or more particular users being different from one or more other users associated with operating the node management computing system and one or more other users associated with operating a different particular node within the federated computing node cluster, wherein the one or more defined user preferences comprises one or more of a preferred type of computing task defined by a user interface selection of the one or more user interface selections, a minimum work output preference defined by a user interface selection of the one or more user interface selections, one or more preferred beneficiaries of computing tasks performed on the particular node defined by a user interface selection of the one or more user interface selections, or a time preference defined by a user interface selection of the one or more user interface selections and indicating one or more preferred time periods for computing tasks to be performed on the particular node;
based on analysis of the received one or more defined user preferences based on the one or more user interface selections by the one or more users associated with operating the particular node, assigning one or more compute jobs to the particular node;
assembling a compute job data packet comprising the one or more compute jobs;
transmitting the assembled compute job data packet to the particular node; and
receiving an indication from the particular node that at least one of the assigned compute jobs has been completed.

17. The method of claim 1, further comprising:
for each particular node within the federated computing node cluster, performing at least:
generating an estimated amount of computing that the particular node will be able to accomplish based on the received one or more defined user preferences by the one or more particular users associated with operating the particular node; and
informing the one or more particular users associated with operating the particular node of the estimated amount of computing that the particular node will be able to accomplish based on the received one or more defined user preferences.

18. The method of claim 1, further comprising:
for each particular node within the federated computing node cluster, performing at least:
based on analysis of the received one or more defined user preferences, generating one or more recommended modifications to the one or more defined user preferences, the one or more recommended modifications being operable, if implemented by the one or more particular users associated with operating the particular node, to alter the computing capabilities of the particular node; and
informing the one or more particular users associated with operating the particular node of the one or more recommended modifications to the one or more defined user preferences.

19. The method of claim 1, wherein the one or more user defined preferences comprise a minimum output preference defined by a user interface selection of the one or more user interface selections.

20. The method of claim 1, wherein the one or more defined user preferences comprise one or more preferred beneficiaries of computing tasks performed on the particular node, the one or more preferred beneficiaries being defined by a user interface selection of the one or more user interface selections.

* * * * *